United States Patent
Sarakas

(10) Patent No.: US 6,485,569 B1
(45) Date of Patent: Nov. 26, 2002

(54) SPRAY CHAMBER AND SYSTEM AND METHOD OF SPRAY COATING SOLID PARTICLES

(75) Inventor: Stephen T. Sarakas, St. Peters, MO (US)

(73) Assignee: Beta Raven, Inc., Earth City, MO (US)

(*) Notice: Subject to any disclaimer, the term of this patent is extended or adjusted under 35 U.S.C. 154(b) by 0 days.

(21) Appl. No.: 09/613,912

(22) Filed: Jul. 11, 2000

(51) Int. Cl.$^7$ ................................................ B05C 5/02
(52) U.S. Cl. ......................................... 118/303; 118/24
(58) Field of Search ........................... 118/303, 24, 19, 118/23, 320, 70; 427/212; 366/137.1, 138

(56) References Cited

U.S. PATENT DOCUMENTS

| | | | |
|---|---|---|---|
| 2,197,792 A | 4/1940 | Erickson | 91/44 |
| 2,685,537 A | 8/1954 | Dunmire | 118/20 |
| 2,862,511 A | 12/1958 | Forsberg | 134/183 |
| 3,101,040 A | 8/1963 | Lanz | 99/235 |
| 3,288,052 A | 11/1966 | Hough | 99/235 |
| 3,640,136 A * | 2/1972 | Nolte | 73/228 |
| 3,716,020 A | 2/1973 | DeWit et al. | 118/303 |
| 3,841,262 A | 10/1974 | Groppenbacher et al. | 118/19 |
| 4,491,608 A | 1/1985 | Thygesen | 427/186 |
| 4,580,698 A * | 4/1986 | Ladt et al. | 222/55 |
| 4,921,674 A | 5/1990 | Enos | 422/28 |
| 5,219,031 A | 6/1993 | Brandt, Jr. | 177/145 |
| 5,230,251 A | 7/1993 | Brandt, Jr. | 73/861.72 |
| 5,287,801 A | 2/1994 | Clark | 99/451 |
| 5,443,637 A | 8/1995 | Long, Jr. et al. | 118/16 |
| 5,993,903 A | 11/1999 | Toepher et al. | 427/242 |
| 6,055,926 A | 5/2000 | Pablo | 118/24 |
| 6,056,822 A | 5/2000 | Jefferson et al. | 118/683 |
| 6,331,210 B1 * | 12/2001 | Dodd | 118/303 |

FOREIGN PATENT DOCUMENTS

| | | | |
|---|---|---|---|
| CA | 937552 | 11/1973 | ................... 241/10 |
| SU | 1411019 | 7/1988 | |

OTHER PUBLICATIONS

Glenn M. Blouin, Method and Apparatus for Applying Coatings to Solid Particles, Published Oct. 1, 1974, Defense Publication T927,005,.

* cited by examiner

Primary Examiner—Richard Crispino
Assistant Examiner—Yewebdar T Tadesse
(74) Attorney, Agent, or Firm—Thompson Coburn LLP

(57) ABSTRACT

A system for applying liquid to solid particles is provided including a constant volume apparatus having a chamber and an aperture arranged to deliver the particles in a substantially constant volume stream to a moving surface such as a conveyor belt. A mass flow-measuring device having a receiving end positioned adjacent the moving surface whereby the constant volume stream flows through the mass flow-measuring device and engages a curved sliding surface of a discharge pan, the curvature discharging the particles from the mass flow-measuring device in the stream at an angle from vertical. A liquid application chamber is positioned below the pan and has an internal passageway with an inlet positioned to receive the stream of particles flowing from the mass flow-measuring device. The passageway is defined by at least one curved wall. The curved wall has an upper portion positioned at an angle approximately identical to the discharge angle of the pan to receive the stream of particles in sliding fashion. The curved wall continuously curves downwardly to vertical and continues its curvature beyond vertical to an exit angle from which the particles exit in the stream. At least one liquid dispensing apparatus is positioned to dispense liquid onto the stream of particles as the stream moves through the passageway.

23 Claims, 2 Drawing Sheets

SPRAY CHAMBER AND SYSTEM AND METHOD OF SPRAY COATING SOLID PARTICLES

BACKGROUND OF THE INVENTION

The present invention is directed to a spray chamber and a system and method of applying liquid to solid particles.

Spray chambers are known having one or more spray nozzles for directing a spray of liquid onto a solid material, such as a large solid surface, or even onto solid particles such as food pellets, coal and seeds. In many known spray chambers, liquid is sprayed or directed onto a free falling curtain or falling mass of particles, such as disclosed in U.S. Pat. Nos. 2,197,792; 2,862,511; 3,288,052; 4,491,608; 4,921,674; 5,287,801 and 5,993,903. It should be noted that the term "spray chamber" as used herein is meant to describe not only chambers where a conventional spraying device, such as a pressurized nozzle is used to dispense liquid, but also any chamber where liquid is applied whether by actual spraying or by other means such as slinging or dripping.

In some known spray chambers, the particulate materials are directed to impinge upon or slide down flat plates or conical surfaces that have constant slopes, either while the particles are being sprayed, or while being directed to a free fall spray area, such as disclosed in U.S. Pat. Nos. 2,197, 792; 2,862,511; 3,288,052; 3,716,020; 4,491,608; 4,921, 674; and 5,993,903, as well as in Canadian Patent 937,552 and Soviet Union Patent No. 1,411,019. In other spray chambers, the particles are sprayed while in a rotating drum or similar chamber, or mixing of the particles in such a rotating chamber is combined with the spraying, such as in U.S. Pat. Nos. 3,101,040; 3,288,052; 3,716,020; 3,841,262; 5,443,637; and 6,056,822, as well as in U.S. Defensive Publication No T927,005. Finally, in some known spray chambers, the particles are projected into a ballistic trajectory and are sprayed with liquid while in such a trajectory, such as in U.S. Pat. No. 2,685,537.

In these known spray chambers, there are many drawbacks, including a lack of precise control for dispensing a liquid onto particles, particulary in minute quantities of liquid relative to the particles, while assuring that the liquid is evenly distributed onto the particles. The lack of uniformity in the liquid application requires added mixing of the particles following or during spraying which, in turn, causes breakage of the particles. The resulting smaller particles typically contain a larger proportion of the applied liquid, and control over the process can be lost altogether when the same particles become lost due to their small size. Another disadvantage often experienced is that of equipment surfaces which tend to build up spray or overspray. At best this represents added difficulty in cleaning. At worst the overspray is an indication that some liquid intended for application is instead being left behind.

In some applications, minute quantities of liquid must be applied to the solid particles, in a precisely controlled manner, and in a manner where the liquid is not subjected to extreme conditions such as high temperature or high pressure. For example, in the process of producing feed pellets, such as chicken feed, minute quantities of liquid enzymes, vitamins and other additives need to be added to the feed pellets after the pellets have been formed by a process involving high pressure and possibly high temperature. Oftentimes the constituents of the liquid cannot be subjected to the high temperatures and/or pressures without losing their potency. For this reason, the liquids must be applied after the pellets are formed. It is important for the additives to be evenly distributed onto the pellets and that the pellets remain unbroken. Mixing the pellets by tumbling, etc., after application of the additives is not helpful and could be detrimental in that the pellets are highly absorptive, so liquid applied to the pellets will remain on the originally sprayed pellets and will not be distributed onto other pellets merely by mixing the pellets, and the mixing process subjects the pellets to impacts which could lead to breakage of the pellets.

SUMMARY OF THE INVENTION

The present invention provides a spray chamber and a system and method of spraying which overcomes the problems in the prior art and allows for a precise amount of liquid, in a relatively minute amount, to be applied to particles in a uniform manner and without requiring separate mixing, while preventing the buildup of overspray on any surfaces which would require separate cleaning.

An integrated system is provided of innovative components which allows for highly predictable results, ease of manufacture and installation as well as control and maintenance.

Particles, which may be pellets, such as animal feed pellets, which are awaiting downstream application of liquid are introduced into the system at a surge hopper. The particles leave the surge hopper and flow downwards into a hood or plenum, which is positioned over a moving surface such as a conveyor belt. A rectangular aperture in the hood permits the particles to flow onto the conveyor in a controlled manner. The aperture is open in the direction of belt travel. The dimensions of the aperture may be adjustable. The resulting ribbon of particles is conveyed away from the plenum and represents a well-shaped pattern of flow. A motor which drives the belt has its speed closely controlled. The shaped flow of particles has a substantially constant volume of flow as the particles enter a mass flow-measuring device.

Variations in the density of the flow of particles are compensated for by a determination of the true mass flow of particles by the mass flow-measuring device. Together with a source of constant volume flow, corrections to the belt speed made by real-time determinations of mass flow by the mass flow-measuring device produces a substantially constant mass of flow as the particles leave the mass flow-measuring device. The particles accelerate during flow through the mass flow-measuring device and begin to separate in space, one from another. The curtain of particles then leaves the mass flow-measuring device in a stream after flowing across a pan. The curtain of particles is then sent into the spray chamber at a certain angle, which is imposed upon the flowing curtain of particles by the pan.

The spray chamber includes an interior passageway, preferably formed of stainless steel, which has a rectangular cross-section that varies in dimension along the path of the particles. The path of ingress into the spray chamber is first against a surface arranged to tangentially intercept the flow of the particles leaving the mass flow-measuring device. The departure angle for the flowing curtain of particles from the pan is commensurate with the angle of ingress into the spray chamber. The spray chamber does not permit the flow of particles to depart from a path of tangential flow along interior surfaces, and the flow of particles is instead made to slide along curved interior surfaces. In a preferred embodiment, the passageway is designed to send the particles by virtue of its vector, first along one wall with a sliding action and subsequently along an opposite wall with the same sliding action. The walls are curved and the path of the particles resembles an "S". Along the described path for the particles through the spray chamber, a liquid is applied to the particles in at least one point, and preferably at at least two separated points in such a manner that any overspraying which may occur is ultimately swept from the same surfaces by the continuing particle flow. The passageway is not sealed, but open at the ends to permit the particle flow. However, the passageway is largely closed to achieve the advantage of closely controlled application of liquid and limited dust and mist escape. Furthermore, the design allows the particles to take a longer sweeping path and prevents the particles from decelerating. Therefore, clogging is eliminated and the particles are not subjected to impacts which could lead to breakage.

BRIEF DESCRIPTION OF THE DRAWINGS

A number of exemplary embodiments of the invention are explained below with reference to the drawings.

DETAILED DESCRIPTION OF THE PREFERRED EMBODIMENTS

Although the present invention has utility in a wide variety of applications where a liquid material is to be applied to solid particles, for disclosure purposes, an embodiment of the invention will be described in which the solid particles may be pellets, such as feed pellets. The liquids sprayed, or otherwise distributed onto the particles, may be a single liquid comprised of a single constituent, or may comprise a single application of multiple constituents, or may comprise multiple applications of single or multiple constituents. Other variations will be described below, or will be apparent to those of skill in the art.

Figure 1:
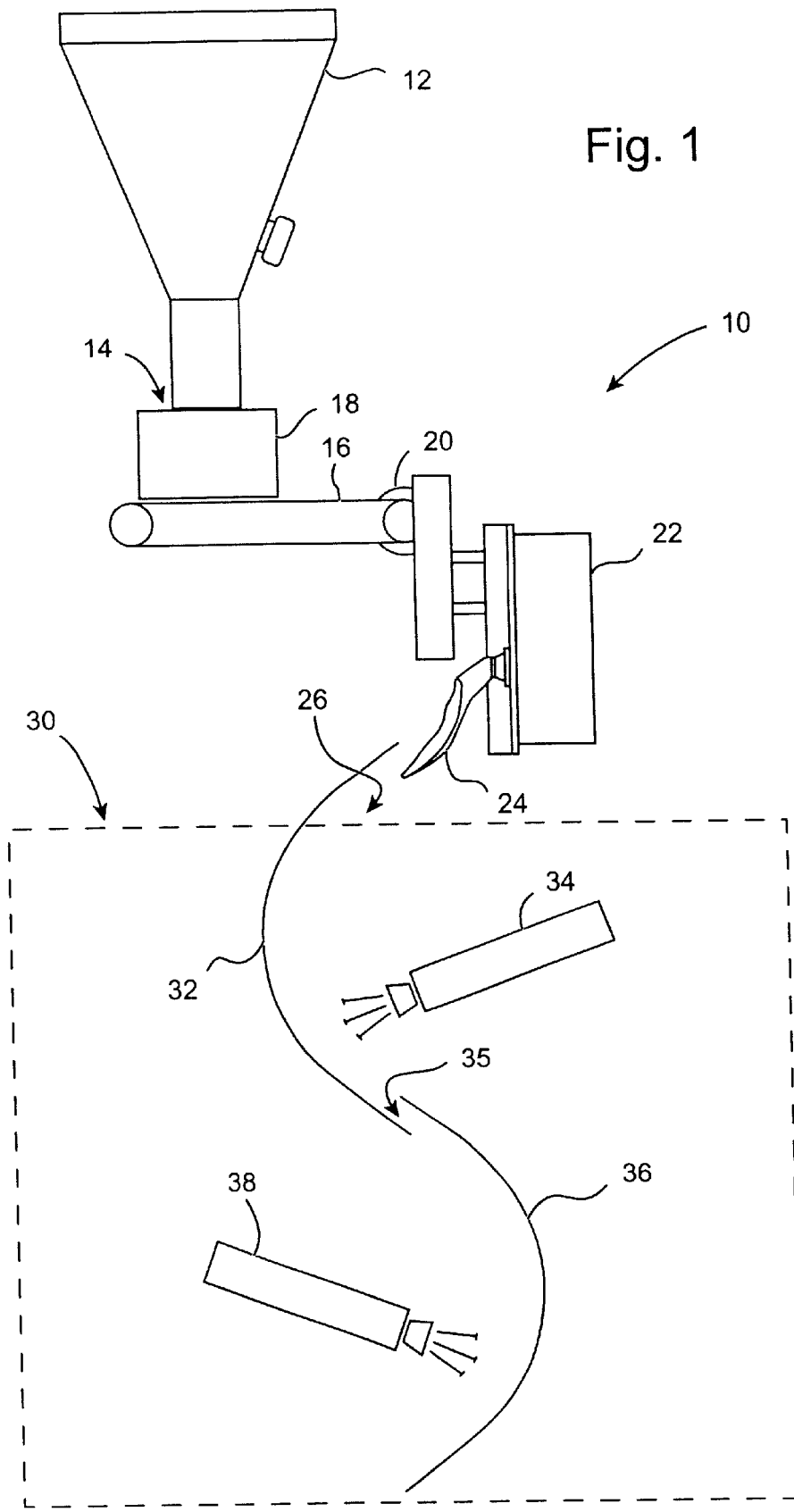
FIG. 1 schematically shows an integrated spray system embodying the principles of the present invention including a solid particle delivery system and a spray chamber for applying liquid to the solid particles.

In FIG. 1 there is schematically illustrated an integrated spray system 10 for applying liquid onto solid particles. The particles, which may be pellets, are first loaded into a reservoir or surge hopper 12, and they may be introduced into the surge hopper either continuously or in batches, either manually or via a variety of loading systems as is generally known. The particles are fed by gravity into a constant volume apparatus 14 from which they are loaded onto a moving surface, for example onto a conveyor belt 16 in a relatively constant volume. The constant volume apparatus 14 generally comprises a hood or plenum 18 which has a rectangular aperture open in the direction of the conveyor belt. For example, the hood 18 may have solid side walls on three sides representing the upstream side (relative to the belt movement) and the two sides which are parallel to the belt movement. The downstream side of the hood may have a rectangular aperture through which the particles are dispensed onto the belt due to the movement of the belt below the hood. The aperture dimensions may be adjustable such that the volume of particles being distributed onto the conveyor belt can be controlled and adjusted as needed. The constant volume apparatus 14 and the hopper 12 may be formed as a single apparatus or as separate components. A ribbon of particles is thus carried away from the plenum by the conveyor belt and represents a well-shaped pattern of flow. A motor 20 which controls the belt speed is closely controlled to assist in providing a constant and known supply of particles from the output of the belt 16 which leads to a mass flow-measuring device 22.

Variations in the density of the flow of particles are compensated for by a determination of the true mass flow of particles by the mass flow-measuring device 22. Such as device is known and is manufactured by Eastern Instruments Laboratories, Inc. of Wilmington, N.C. as the "CentriFlow". This product is disclosed in U.S. Pat. Nos. 5,219,031 and 5,230,251, the disclosures of which are incorporated herein by reference. The mass flow-measuring device 22 provides a controlling signal to the belt motor 20 through real time determinations of mass flow which results in substantially constant mass of flow as the particles leave the mass flow-measuring device 22. As the particles fall through the mass flow-measuring device they accelerate due to gravity and begin to separate from one another. The particles engage a curved pan 24 as they leave the mass flow-measuring device 22 which directs the particles in the form of a curtain of falling particles at an angle offset from vertical as they fall from the pan.

In a preferred arrangement, the particles free fall under the influence of gravity through the mass flow-measuring device. The particles tangentially engage a surface of the pan 24, which is essentially vertical, and begin to slide along the pan as it curves away from vertical. As the stream of particles slides along the curved pan, the mass of the stream is measured due to the pressing of the stream against the curved surface of the pan. The stream of particles leaves the pan, and hence the mass flow-measuring device at an angle from vertical. This angle can be set by the exit angle of the pan itself or by some other surface associated with or adjacent to the mass flow-measuring device. In a preferred arrangement, the angle is in the range of 20 to 50 degrees from vertical, but could be at other angles, depending on the application involved.

The particles are then introduced into a passageway 26 of a spray chamber 30 (also referred to as a liquid application chamber) at the angle which they leave the pan 24. The passageway has first vane comprising a first curved wall 32 which the curtain of particles engages tangentially with minimal impact, and which causes the particles to slide along the wall. The wall curves through a continuously steeper slope, thus maintaining the particles against the wall in a nearly unchanging flow shape of particles. The flow volume can be adjusted such that the particles slide down the wall 32 essentially in a single particle thickness spaced across the full width of the wall. The dimensions of the wall 32 and the passageway 26 can be selected to accommodate the particular application in which the invention is being utilized.

The wall 32 continues to curve beyond vertical, again causing the particles to be held against the wall 32 due to gravity and centrifugal forces. Along the length of the curving wall 32 there is positioned a liquid dispensing apparatus 34 which may be in the form of a sprayer, or other liquid dispensing constructions such as a rotating slinger disk, drip openings or other known apparatus for dispensing liquids. The liquid dispensing apparatus 34 dispenses a liquid onto the flowing particles as they slide down the wall 32. The volume of liquid can be precisely controlled, especially since the mass of the particles is known from the mass flow-measuring device 22. Any liquid which strikes the wall 32 in between particles is quickly picked up by the flowing curtain of particles sliding down the wall, thus assuring that all of the liquid being dispensed is applied to the particles, and greatly reducing any need for cleaning of the wall. The liquid dispensing apparatus can be adjusted to direct liquid only to the area of the wall where the flow of particles is present. The flow of particles exits the wall 32 at an angle from vertical. In a preferred embodiment that angle is between 20 and 50 degrees from vertical, but the angle could be different depending on the particular application.

The stream of particles is directed by the lower portion of the wall into a mist combination zone 35 which is a narrow space between the lower portion of the first wall 32 and an upper portion of a second wall 36 of a second vane. In the mist combination zone, the particle stream crosses the space between the two walls and any mist or fine droplets of suspended spray which are carried along by the air flow through the spray chamber pass through this space and are captured and absorbed by the particle stream. This helps prevent the escape of spray mist from the spray chamber.

The second wall 36 preferable is positioned below (with a slight overlap) and opposite the first wall 32. The second wall is also curved, in mirror fashion to the first wall, and has an upper portion which is angled at essentially the same angle as a lower portion of the first wall, thus the flowing curtain of particles engages the second wall 36 in a tangential manner, hence essentially avoiding any impact stress on the particles. The second wall 36 curves through a continuously steeper slope, thus maintaining the particles against the wall in a nearly unchanging flow shape of particles.

The second wall 36 continues to curve beyond vertical, again causing the particles to be held against the wall 36 due to gravity and centrifugal forces. Along the length of the second wall 36 there may be positioned a second liquid dispensing apparatus 38 of the same or different type from the first liquid dispensing apparatus 34 described above. The second liquid dispensing apparatus 34 may dispense the same or a different liquid onto the flowing particles as they slide down the second wall 36. Again, the volume of liquid can be precisely controlled, especially since the mass of the particles is known from the mass flow-measuring device 22. Any liquid which strikes the second wall 36 in between particles is quickly picked up by the flowing curtain of particles sliding down the wall, thus assuring that all of the liquid being dispensed is applied to the particles, and greatly reducing any need for cleaning of the wall. The liquid dispensing apparatus 38 can be adjusted to direct liquid only to the area of the wall 36 where the flow of particles is present.

Following below a lower portion of the second wall, and thus the end of the passageway 26, the particles are dispensed to a point of further utilization or storage. For example, the particles can be dispensed into a storage container or onto a further conveyor which transports them to a point of further treatment, packaging or use, as necessary or desired. The particles may be dispensed at an angle offset from vertical, such as an angle of between 20 and 50 degrees from vertical, but other angles could be selected as well, including an essentially vertical dispensing angle.

Figure 2:
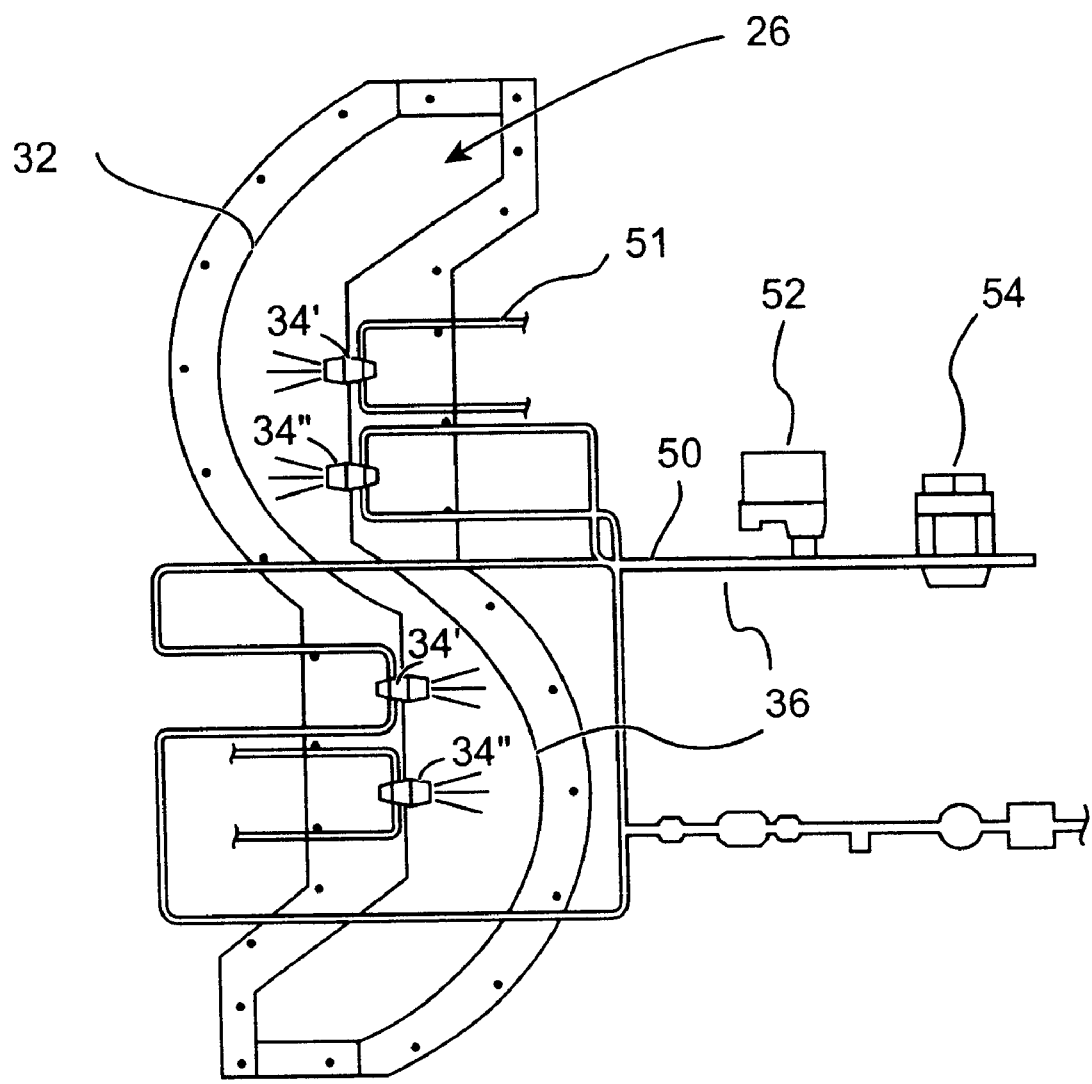
FIG. 2 schematically shows an alternative embodiment of a spray chamber embodying the principles of the present invention.

FIG. 2 illustrates another embodiment of the spray chamber embodying the principles of the invention which is similar in many respects to the embodiment described above, however, along each curved wall 32, 36, there are located multiple liquid dispensing apparatus 34', 34", 38', 38". These additional liquid dispensing apparatus can be used to dispense other liquids or higher quantities of a single liquid, as the application requires. Also, each of the different liquid dispensing apparatus can be similar in construction, or may be different from each other as the needs for dispensing the liquid(s) require. As schematically illustrated, the sprayers can be supplied with liquid through conduits 50, 51 which may be interconnected, or separate. Also, various elements such as valves 52 and flow meters 54 may be provided in the conduits 50 to precisely control the amount of liquid being applied, particularly in conjunction with a signal from the mass flow-measuring devices 22 in order to apply a precise amount of liquid to the stream of particles. Other liquid control and metering device can be used as is known in the art.

From the foregoing, it is seen that the present invention provides many advantageous processes and constructions. For example, the flow of particles through the spray chamber is continuous, providing for a continuous supply of treated particles. A constant volume of particles is first created, and this is corrected to a flow of substantially constant mass, by the mass flow-measuring device 22 and the control of the belt motor 20. The velocity of particles leaving the mass flow-measuring device does not vary with differing rates of particle flow. As the particles depart from the pan 24 of the mass flow-measuring device, the velocity of the particles will increase by the same amount before entering the spray chamber 30, regardless of the rate of particle flow. The directed path into space, imposed upon the flow of particles during departure from the mass flow-measuring device, does not significantly vary with differing rates of particle flow. The consequential path of entry into the spray chamber 30 does not vary significantly with differing rates of particle flow. The path of flowing particles into the spray chamber is immediately tangential to the surface of the first curved wall 32 of the spray chamber passageway 26. The width of the flow of particles passing through the mass flow-measuring device 22 and into the spray chamber 30 does not vary with differing rates of particle flow. The width of the flow of particles is also commensurate with the pattern of liquid spraying. The effective thickness of the curtain of flowing particles passing the point of liquid application does not vary across the width of the curtain. The mass flow of particles is determined immediately prior to particle flow into the spray chamber 30, and the liquid application does not interfere with the mass flow-measuring device 22. Immediate feedback of the mass flow rate of particles permits adjustments to be made in the rate of liquid application during the coating operation.

The velocity of particles does not significantly increase during passage through the spray chamber. This results in limited lateral fanning of the curtain of flowing particles, and little consequential sidewall interference. The particles are not permitted to decelerate as they flow through the spray chamber 30, so clogging is eliminated. Particles do not strike surfaces along the path of flow through the spray chamber 30, thereby eliminating breakage of particles. Particles are either carried along or slide smoothly across surfaces, at all points along the path of flow. At least one mist combination zone 35 is used to send the particles and any fine droplets of suspended spray into a constricted passageway together, thereby encouraging the absorption of any fine mist. The second application of liquid is made onto the opposite side of the particles, thereby improving the uniformity of application.

The present invention has been described utilizing particular embodiments. As will be evident to those skilled in the art, changes and modifications may be made to the disclosed embodiments and yet fall within the scope of the present invention. The disclosed embodiments are provided only to illustrate aspects of the present invention and not in any way to limit the scope and coverage of the invention.

The scope of the invention is therefore only to be limited by the appended claims.

I claim as my invention:

1. A system for applying liquid to solid particles comprising:
   a constant volume apparatus having a chamber and an aperture arranged to deliver said particles in a substantially constant volume stream to a moving surface,
   a mass flow-measuring device having a receiving end positioned adjacent said moving surface whereby said constant volume stream flows through said mass flow-measuring device and engages a curved sliding surface of a discharge pan, said curvature discharging said particles from said mass flow-measuring device in said stream at an angle from vertical,
   a liquid application chamber positioned below said pan and having an internal passageway with an inlet positioned to receive said stream of particles flowing from said mass flow-measuring device,
   said passageway defined by at least one curved wall, said curved wall having an upper portion positioned at an angle approximately identical to said discharge angle of said pan to receive said stream of particles in sliding fashion, said curved wall continuously curving downwardly to vertical and continuing its curvature beyond vertical to an exit angle from which said particles exit in said stream, and
   at least one liquid dispensing apparatus positioned to dispense liquid onto said stream of particles as said stream moves through said passageway.

2. A system according to claim 1, wherein said moving surface comprises a continuous conveyor belt driven by a motor.

3. A system according to claim 2, wherein said mass flow-measuring device includes a signal output which is operable to control a speed of said motor such that the particles are discharged from said mass flow-measuring device at a substantially constant mass per unit of time.

4. A system according to claim 1, wherein said angle of discharge from said pan is in the range of 20 to 50 degrees from vertical.

5. A system according to claim 1, wherein said exit angle from said at least one curved wall is in the range of 20 to 50 degrees from vertical.

6. A system according to claim 1, wherein said at least one dispensing apparatus is arranged to dispense liquid against said stream of particles as they are sliding on said curved wall.

7. A system according to claim 1, wherein said first dispensing apparatus comprises a liquid sprayer.

8. A system according to claim 1, wherein said constant volume apparatus comprises a plenum having a predetermined sized aperture positioned adjacent said moving surface.

9. A system according to claim 1, wherein said constant volume apparatus includes a hopper into which a charge of particles is fed.

10. A system according to claim 1, wherein said liquid application chamber includes at least two curved walls, a first curved wall and a second curved wall, wherein said second curved wall is located substantially below said first curved wall and is a mirror image of said first curved wall.

11. A system according to claim 10, wherein said dispensing angle from said second curved wall is in the range of 20 to 50 degrees from vertical.

12. A system according to claim 10, including a second dispensing apparatus, said first dispensing apparatus arranged to dispense liquid against said stream of particles as they are sliding on said first wall and said second dispensing apparatus arranged to dispense liquid against said stream of particles as they are sliding on said second wall.

13. A system according to claim 1, including at least two liquid dispensing apparatus positioned in said passageway.

14. A system for applying liquid to solid particles comprising;
   a hopper containing said particles;
   a discharge pan in operative communication with said hopper for receiving a stream of said particles and discharging said stream of particles at an angle from vertical; and
   a liquid application chamber having a curved wall positioned to tangentially intercept said stream of particles from said discharge pan and a liquid dispensing apparatus positioned to dispense liquid onto said stream of particles.

15. A system according to claim 14 wherein said curved wall further comprises an upper portion positioned at an angle approximately identical to said discharge angle of said discharge pan.

16. A system according to claim 14 wherein said curved wall further comprises a continuously steeper slope to vertical and a continuing curvature beyond vertical to an exit angle.

17. A system according to claim 16 wherein said liquid application chamber further comprises a second curved wall, said second curved wall positioned to tangentially intercept said stream of particles from said exit angle.

18. A system according to claim 17 wherein said second curved wall has a curvature substantially in mirror of said continuously steeper slope and said continuing curvature.

19. A system for applying liquid to solid particles comprising:
   a hopper adapted to contain the particles;
   a discharge pan adapted to receive the particles from the hopper and to discharge said particles as a particle stream, the discharge pan being shaped and configured to discharge the particles in a first direction; and
   a liquid application chamber comprising a first vane, a second vane spaced from the first vane, a first liquid dispenser and a second liquid dispenser, the first vane defining a first portion of a particle stream pathway and the second vane defining a second portion of the particle stream pathway, the first vane being positioned relative to the discharge pan and adapted to cause the particles discharged from the discharge pan to travel along the first portion of the particle stream pathway and to redirect the particles in a manner such that the particles exit the first vane in a second direction different than the first direction, the second vane being positioned relative to the first vane and adapted to cause the particles that exit the first vane to travel along the second portion of the particle stream pathway and to redirect the particles in manner such that the particles exit the second vane in a third direction different than the second direction, the first liquid dispenser being positioned relative to the first vane and adapted to dispense liquid onto the particles traveling along the first portion of the particle stream, the second liquid dispenser being positioned relative to the second vane and adapted to dispense liquid onto the particles traveling along the second portion of the particle stream.

20. A system according to claim 19 wherein:
   the first vane includes a first curved wall defining the first portion of the particle stream pathway; and the second vane includes a second curved wall defining the second portion of the particle stream pathway.

21. A system according to claim 20 wherein:

the first curved wall is positioned and adapted to tangentially intercept the particles discharged from the discharge pan in the first direction; and the second curved wall is positioned and adapted to tangentially intercept the particles exiting the first vane in the second direction.

22. A system for applying liquid to solid particles comprising:

a hopper containing said particles;

a discharge pan in operative communication with said hopper for receiving a stream of said particles and discharging said stream of particles at an angle from vertical; and a liquid application chamber having an internal passageway with an inlet at a top end for receiving said stream of said particles from said discharge pan, said passageway defined by at last one curved wall, said curved wall having an upper portion positioned at an angle approximately identical to said discharge angle of said discharge pan and positioned to tangentially intercept said stream of particles from said discharge pan, said curved wall continuously curving downwardly to vertical and continuing its curvature beyond vertical to an exit angle from which said particles exit in said stream, and at least one liquid dispensing apparatus positioned to dispense liquid onto said stream of particles as said stream moves through said passageway.

23. A system according to claim 22 wherein said liquid application chamber further comprises a second curved wall, wherein said second curved wall is located to tangentially intercept said stream of particles from said exit angle.

* * * * *